W. B. FAHNESTOCK.
Car Wheel.
No. 19,763. Patented Mar. 30, 1858.
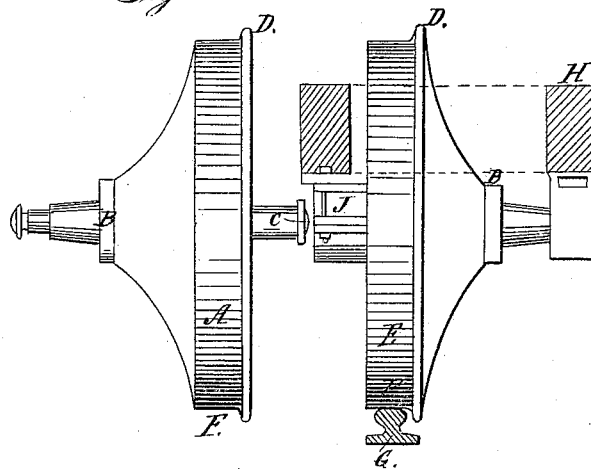
Fig. 1.
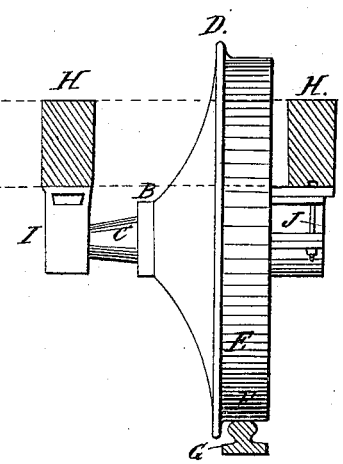
Fig. 2.
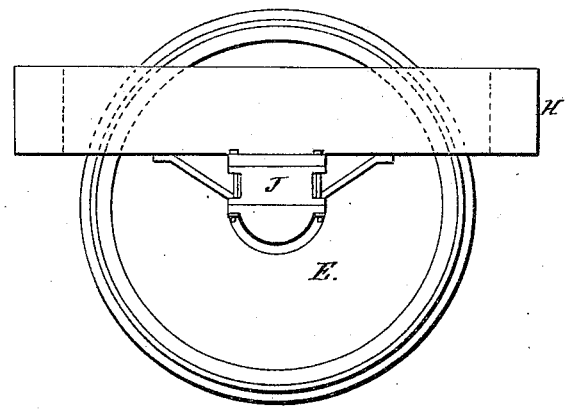
Fig. 3.
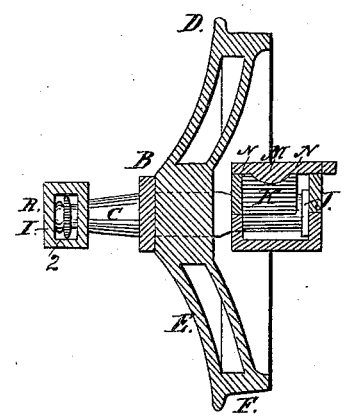
Fig. 4.
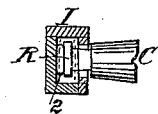
Fig. 7.
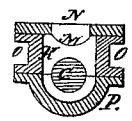
Fig. 6.
Fig. 5.

UNITED STATES PATENT OFFICE.

WM. B. FAHNESTOCK, OF LANCASTER, PENNSYLVANIA.

CAR-WHEEL.

Specification of Letters Patent No. 19,763, dated March 30, 1858.

*To all whom it may concern:*

Be it known that I, WILLIAM B. FAHNESTOCK, of Lancaster city, county of Lancaster, and State of Pennsylvania, have invented new and useful improvements in railway-car wheels and boxes, so as to prevent the friction of the flanges against the sides of the rail, giving each wheel a separate and independent movement, and thus preventing the wheel on the inner curve from sliding; and I do hereby declare that the following is a full, clear, and exact description thereof, reference being had to the accompanying drawings and the letters of reference marked thereon.

My improvements consists, first, in so constructing the wheel that it has the advantage of being independent single bearing and self balancing; and secondly in improved boxes in which the ends of the axle revolve at the same time that they describe the necessary arc of a circle, thereby giving the wheel perfect freedom to follow the line of the rail and consequently preventing the sliding and friction of the wheels on or against the rails.

To enable others skilled in the art of making and using my invention, I will proceed to describe the construction and operation.

Figure 1 represents the shape of a cast iron car wheel A (for an inside bearing) having its concave plate or spokes curving from the edge of the tread or rim to the outside of the hub B. The wheel is firmly attached to a short axle C, and the shape of the wheel is such that the hub B shall be outside of the rim or line of the rail, and the flange D, on the inside of the edge of the tread or rim. The axle C is fastened to the wheel in length sufficient to extend into the boxes on each side of the wheel.

Fig. 2 represents the shape of a pair of cast iron car wheels E (for an outside bearing) having their concave plates or spokes curving from the flange D to their hubs B. This wheel E is also attached to a short axle C and the shape of the wheel is such that the hub B shall be outside of the rim or tread F, as regards the wheel, but inside of the line of the rail G, the flange D being on the inside edge of the tread or rim F. H represents the frame or truck to which the boxes I and J are fastened. The axle C is intended to be about two feet long.

Fig. 3 represents the side of the car wheel E, with the outside bearing its box J and frame or timber H.

Fig. 4 represents a cross section of wheel E with its outside bearing K, axle C and boxes I and J. This exhibits the bearing K within the perpendicular line of the tread or rim E of the wheel. The bearing K (as seen at Fig. 5) is made of brass or other metal—is circular in shape (with a concavity M in the top, in which a pivot N rests) and is concave below half the depth of the axle C to receive the axle and allow it to turn with the line of the rail. The pivot N is cast solid with the top plate of the box J. The center or middle part O of the box J (as seen at Fig. 6) is shaped to receive the bearing and allow the axle to play. The lower part P of box J is shaped so as to allow the axle to play, at the same time that there is space enough for holding the oil and sponge to lubricate the axle.

Fig. 7: The opposite end of the axle C operates in a slot 2 in the box I and describes the necessary arc of a circle according to the curve of the rail, at the same time that it revolves in a movable brass ring R fitted to its end, to prevent friction.

If the wheels above described be cast with a double flange, the result will be the same, and will then answer for either an inside or outside bearing.

What I claim as my invention and desire to secure by Letters Patent is:

1. The wheel with the hub outside of the tread or rim, and the bearing on the axle, within the tread or rim or at the balancing point.

2. I also claim the combination of the independent wheel-bearing K and pivot M with the short axle for the purpose of preventing the sliding and friction of the wheels on or against the rail.

WM. B. FAHNESTOCK.

Witnesses present:
J. FRANKLIN REIGART,
J. A. SHEAFF.